(12) United States Patent
Huck

(10) Patent No.: US 10,676,110 B2
(45) Date of Patent: Jun. 9, 2020

(54) PRE-LOADED COMPRESSION STRUT

(71) Applicant: Trinity Industries, Inc., Dallas, TX (US)

(72) Inventor: Kenneth W. Huck, Fairview, TX (US)

(73) Assignee: Trinity Industries, Inc., Dallas, TX (US)

( * ) Notice: Subject to any disclaimer, the term of this patent is extended or adjusted under 35 U.S.C. 154(b) by 329 days.

(21) Appl. No.: 15/848,141

(22) Filed: Dec. 20, 2017

(65) Prior Publication Data

US 2018/0180129 A1 Jun. 28, 2018

Related U.S. Application Data

(60) Provisional application No. 62/437,744, filed on Dec. 22, 2016.

(51) Int. Cl.

| | | |
|---|---|---|
| *B61D 7/18* | (2006.01) | |
| *F16F 3/04* | (2006.01) | |
| *B61D 7/20* | (2006.01) | |
| *B61D 7/26* | (2006.01) | |
| *B61D 7/28* | (2006.01) | |
| *F16F 9/32* | (2006.01) | |
| *F16B 7/06* | (2006.01) | |
| *B61D 7/24* | (2006.01) | |
| *F16F 1/12* | (2006.01) | |
| *F16C 7/06* | (2006.01) | |

(52) U.S. Cl.
CPC ............... *B61D 7/18* (2013.01); *B61D 7/20* (2013.01); *B61D 7/24* (2013.01); *B61D 7/26* (2013.01); *B61D 7/28* (2013.01); *F16B 7/06* (2013.01); *F16F 3/04* (2013.01); *F16F 9/3271* (2013.01); *F16C 7/06* (2013.01); *F16F 1/128* (2013.01)

(58) Field of Classification Search
CPC ... B61D 7/02; B61D 7/18; B61D 7/24; B61D 7/26; B61D 7/28; Y10T 403/295; F16B 7/06; F16C 7/06; F16D 65/46; F16F 3/04; F16G 11/12
USPC ........................................................ 105/304
See application file for complete search history.

(56) References Cited

U.S. PATENT DOCUMENTS

| | | | | |
|---|---|---|---|---|
| 1,659,544 | A * | 2/1928 | Dodge | F16D 65/46 188/196 R |
| 2,563,423 | A * | 8/1951 | Samothrakis | F16F 3/04 267/175 |
| 3,137,247 | A * | 6/1964 | Hamilton | B61D 7/26 105/251 |
| 3,462,137 | A * | 8/1969 | Grube | B60P 7/0823 410/41 |

(Continued)

*Primary Examiner* — Zachary L Kuhfuss
(74) *Attorney, Agent, or Firm* — Baker Botts, LLP

(57) ABSTRACT

According to some embodiments, a compression strut comprises a first strut body comprising a threaded end and a hollow end, and a second strut body comprising a threaded end and a shaped end. The hollow end of the first strut body is slidably coupled to the shaped end of the second strut body. A spring is disposed between the first strut body and the second strut body configured to resist longitudinal compression of the compression strut. The first strut body is rotationally coupled to the second strut body so that rotation of the first strut body also rotates the second strut body and rotation of the second strut body also rotates the first strut body. A first ball end is threaded to the first strut body and a second ball end is threaded to the second strut body.

14 Claims, 7 Drawing Sheets

(56) References Cited

U.S. PATENT DOCUMENTS

| | | | | |
|---|---|---|---|---|
| 3,610,606 A * | 10/1971 | Andrews | | F16F 15/02 |
| | | | | 267/74 |
| 3,872,796 A * | 3/1975 | Adler | | B61D 7/30 |
| | | | | 105/241.2 |
| 4,194,450 A * | 3/1980 | Miller | | B61D 7/24 |
| | | | | 105/253 |
| 4,627,375 A * | 12/1986 | Davis | | B63B 21/00 |
| | | | | 114/219 |
| 5,702,196 A * | 12/1997 | Petercsak | | F16B 7/06 |
| | | | | 280/93.502 |
| 6,158,374 A * | 12/2000 | Free, Jr. | | B63B 21/00 |
| | | | | 114/215 |
| 6,773,002 B2 * | 8/2004 | Adoline | | F16F 3/04 |
| | | | | 267/168 |
| 7,051,661 B2 * | 5/2006 | Herzog | | B61D 7/02 |
| | | | | 105/286 |
| 7,066,455 B2 * | 6/2006 | Adoline | | F16F 1/128 |
| | | | | 267/168 |
| 7,350,628 B2 * | 4/2008 | Adoline | | F16F 3/04 |
| | | | | 188/67 |
| 7,677,539 B2 * | 3/2010 | Adoline | | F16F 13/007 |
| | | | | 188/304 |
| 7,681,507 B2 * | 3/2010 | Herzog | | B61D 7/02 |
| | | | | 105/286 |
| 7,735,426 B2 * | 6/2010 | Creighton | | B61D 7/28 |
| | | | | 105/286 |
| 7,891,304 B2 * | 2/2011 | Herzog | | B61D 7/28 |
| | | | | 105/286 |
| 9,188,184 B2 * | 11/2015 | Adoline | | F16F 3/04 |
| 10,252,730 B2 * | 4/2019 | Huck | | B61D 7/02 |
| 10,449,975 B2 * | 10/2019 | Huck | | B61D 7/02 |
| 2004/0113341 A1 * | 6/2004 | McConnell | | F16F 1/12 |
| | | | | 267/195 |
| 2006/0027955 A1 * | 2/2006 | Adoline | | F16F 1/128 |
| | | | | 267/64.12 |
| 2007/0001356 A1 * | 1/2007 | Adoline | | F16F 1/128 |
| | | | | 267/168 |
| 2012/0202628 A1 * | 8/2012 | Six | | F16H 7/1236 |
| | | | | 474/110 |
| 2012/0224913 A1 * | 9/2012 | Haller | | F16B 7/06 |
| | | | | 403/46 |
| 2018/0180129 A1 * | 6/2018 | Huck | | F16F 3/04 |
| 2018/0201279 A1 * | 7/2018 | Huck | | B61D 7/02 |

* cited by examiner

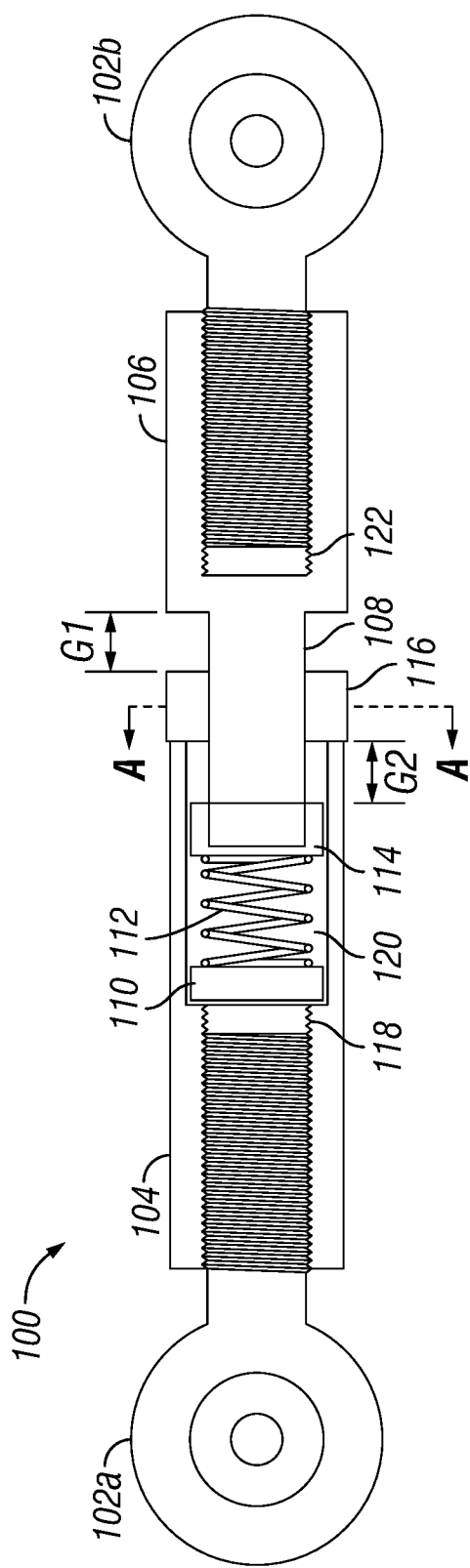
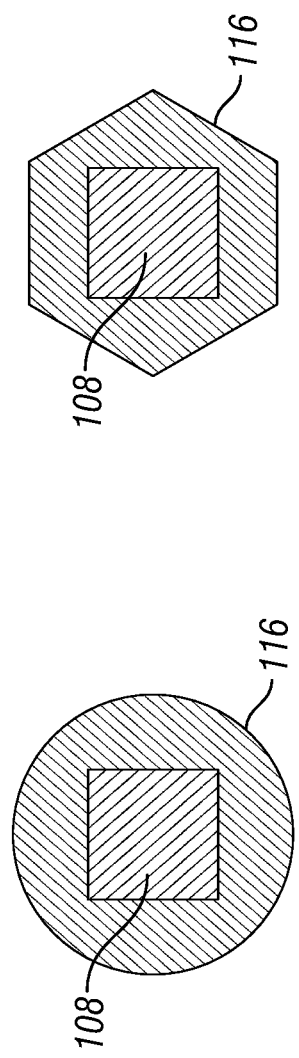
FIG. 7
FIG. 8A
FIG. 8B

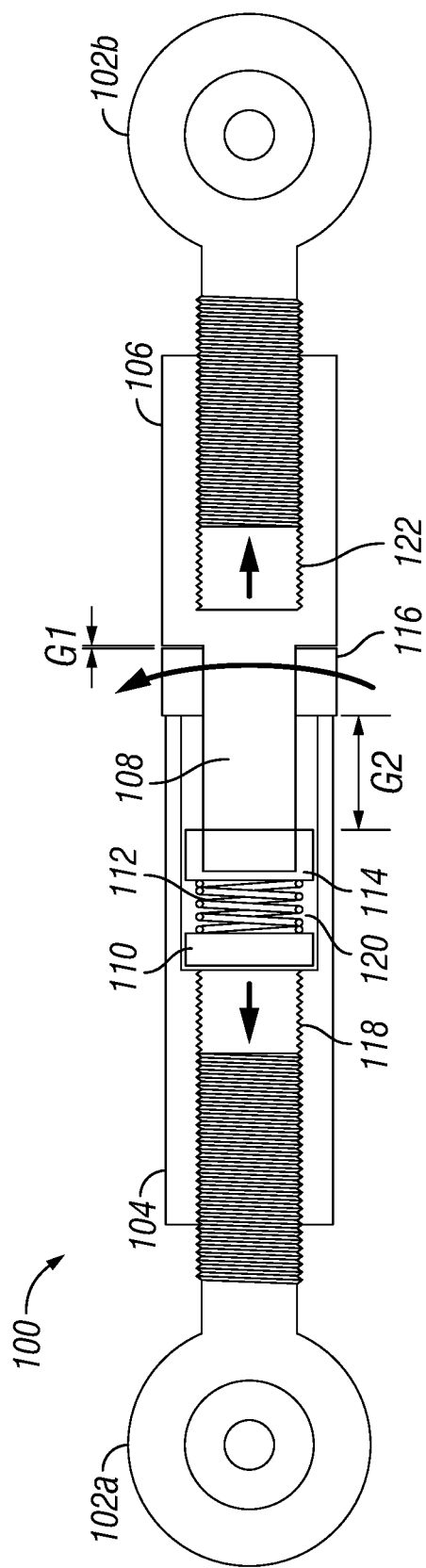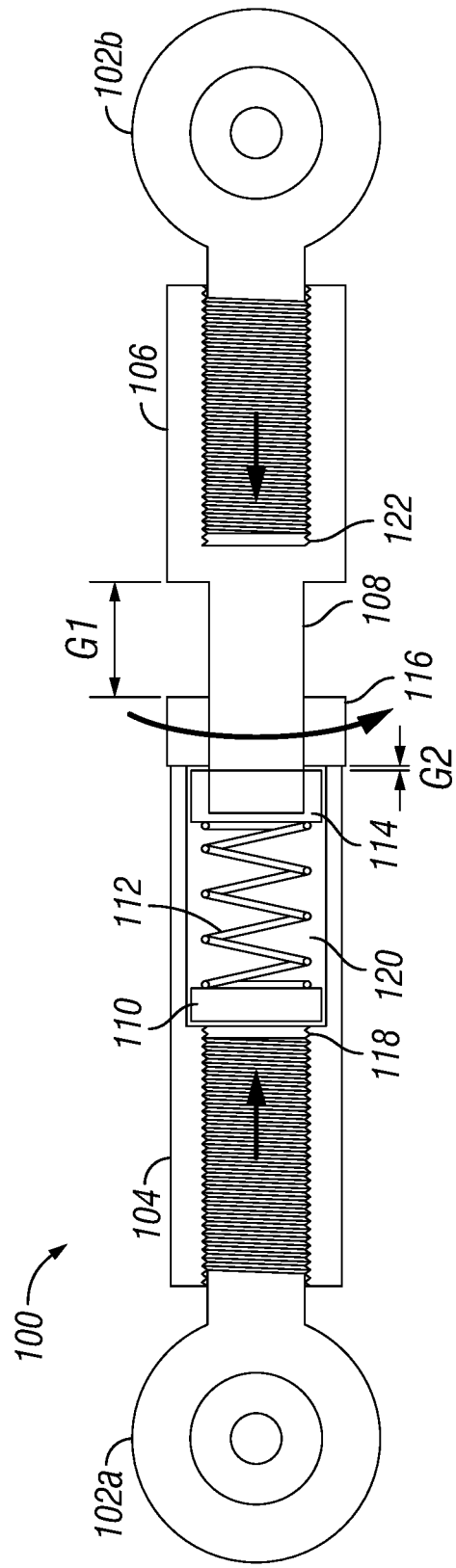

PRE-LOADED COMPRESSION STRUT

RELATED APPLICATIONS

This application claims priority to U.S. Provisional Application Ser. No. 62/437,744 entitled "PRE-LOADED COMPRESSION STRUT," filed Dec. 22, 2016.

TECHNICAL FIELD

This disclosure generally relates to compression struts, and more particularly to a pre-loaded compression strut for use with a discharge gate of a railcar.

BACKGROUND

A strut is a structural component that resists longitudinal compression. A strut provides support in its longitudinal direction, which may be used to separate two components. A railcar may include struts in various operating mechanisms.

For example, a railroad hopper car includes one or more hoppers with discharge gates near the bottom of each hopper to rapidly discharge cargo. Various operating mechanisms may be used to open and close the discharge gates. One mechanism includes a center beam connected to longitudinal discharge gates via struts. The center beam may be operable to slide in the longitudinal direction. As the center beam moves back and forth (e.g., manually, pneumatically, electrically, etc.), the struts push or pull the discharge gates open or closed. A compression strut may be used to provide a compressive force against the discharge gate, strengthening the seal when the discharge gate is in the closed position.

SUMMARY

According to some embodiments, a compression strut comprises a first strut body comprising a threaded end and a hollow end, and a second strut body comprising a threaded end and a shaped end. The first strut body is slidably coupled to the shaped end of the second strut body. A spring is disposed between the first strut body and the second strut body. The spring is arranged to resist longitudinal compression of the compression strut. The first strut body is rotationally coupled to the second strut body so that rotation of the first strut body also rotates the second strut body and rotation of the second strut body also rotates the first strut body.

In particular embodiments, an end cap is coupled to the hollow end of the first strut body. The end cap is configured to provide rotational friction with the shaped end of the second strut body, rotationally coupling the first strut body and the second strut body. A block may be coupled to the shaped end of the second strut body. The block and the end cap are configured to prevent the second strut body uncoupling from the first strut body. The end cap may be removably coupled to the hollow end of the first strut body.

In particular embodiments, the spring is disposed within the hollow end of the first strut body. A washer may be disposed in the hollow portion of the first strut body. The washer is configured to apply a particular pre-load to the spring. The spring may comprise at least one of a coil spring, an extension spring, a washer-type spring, an elastomeric material, a gas, and a fluid.

In particular embodiments, a first ball end is threaded to the first strut body and a second ball end is threaded to the second strut body.

According to some embodiments, a railcar comprises an underframe, a pair of sidewall assemblies, at least one hopper formed between the sidewall assemblies, and a gate assembly coupled to the at least one hopper to control the discharge flow of lading from the at least one hopper. The gate assembly comprises at least one discharge gate coupled to a gate actuator via at least one compression strut. The at least one compression strut comprises a first strut body comprising a threaded end and a hollow end, and a second strut body comprising a threaded end and a shaped end. The hollow end of the first strut body is slidably coupled to the shaped end of the second strut body. A spring is disposed between the first strut body and the second strut body configured to resist longitudinal compression of the compression strut. The first strut body is rotationally coupled to the second strut body so that rotation of the first strut body also rotates the second strut body and rotation of the second strut body also rotates the first strut body.

According to some embodiments, a method of assembling a compression strut comprises: providing a first strut body comprising a threaded end and a hollow end; providing a second strut body comprising a threaded end and a shaped end; positioning a spring between the first strut body and the second strut body configured to resist longitudinal compression of the compression strut; and slidably coupling the hollow end of the first strut body to the shaped end of the second strut body.

In particular embodiments, positioning a spring between the first strut body and the second strut body comprises positioning a spring in the hollow end of the first strut body. Slidably coupling the hollow end of the first strut body to the shaped end of the second strut body comprises: sliding an end cap over the shaped end of the second strut body; coupling a block to the shaped end of the second strut body; inserting the second strut body, end cap, and block into the hollow end of the first strut body; and coupling the end cap to the hollow end of the first strut body.

As a result, particular embodiments of the present disclosure may provide numerous technical advantages. For example, particular embodiments accommodate dimensional changes affecting the length of the strut without significant loss of compressive load. The strut is flexible such that the spring rate, amount of strut extension, and amount of compression may be varied to accommodate various designs. Another advantage is that the strut may be tightened to a designed-in preload without the use of special tools or instrumentation. For example, when the strut is tightened to minimize the gap between strut bodies, the specific preload is known. All struts tightened to this point will have the same preload.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein:

FIG. 7 is a schematic drawing of a cross section of an example preloaded compression strut, according to a particular embodiment;

FIG. 8A is a schematic drawing of a cross section of the end cap of an example preloaded compression strut, according to a particular embodiment;

FIG. 8B is another schematic of a cross section of the end cap of an example preloaded compression strut, according to a particular embodiment;

FIG. 9 is a schematic drawing of a cross section of an example preloaded compression strut adjusted to increase compression, according to a particular embodiment;

FIG. 10 is a schematic drawing of a cross section of an example preloaded compression strut adjusted to decrease compression, according to a particular embodiment.

DETAILED DESCRIPTION

Compression struts may be used for various operating mechanisms of a railcar. One example includes an operating mechanism used to open and close the discharge gates of a hopper car. A center beam may be connected to longitudinal discharge gates via struts. The center beam may be operable to slide in the longitudinal direction. As the center beam moves back and forth (e.g., manually, pneumatically, electrically, etc.), the struts push or pull the discharge gates open or closed. A compression strut may be used to provide a compressive force against the discharge gate, strengthening the seal when the discharge gate is in the closed position. An example hopper car is illustrated in FIG. 1.

Figure 1:
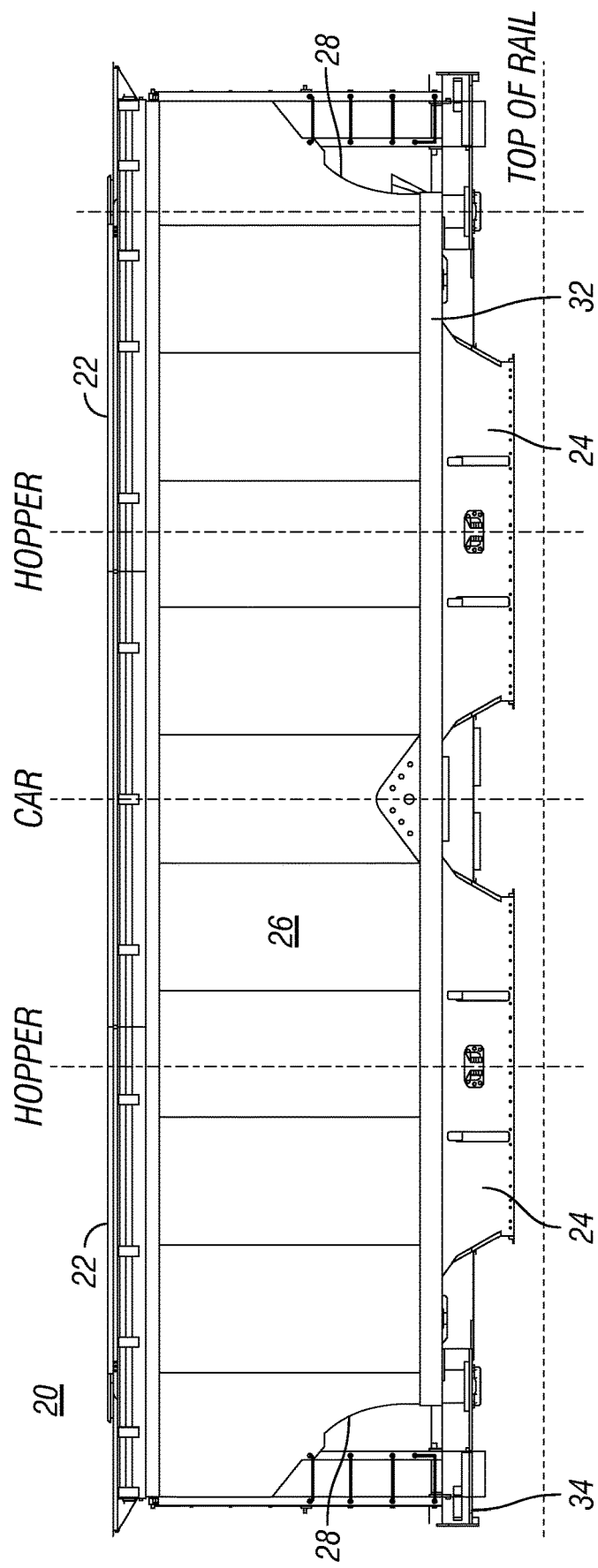
FIG. 1 is a schematic drawing in elevation showing a side view of an example hopper car.

FIG. 1 is a schematic drawing in elevation showing a side view of an example hopper car. Hopper car 20 may carry bulk materials such as coal and other types of lading. Examples of such lading may include sand, metal ores, aggregate, grain, ballast, etc.

Hopper car 20 includes hoppers 22 with bottom discharge assemblies 24. Discharge assemblies 24 may be opened and closed to control discharge of lading from hoppers 22. As illustrated, hopper car 20 includes two hoppers 22.

Hopper 22 is configured to carry bulk materials and the interior walls of hopper 22 are generally sloped towards discharge assembly 24 to facilitate discharge of the lading. Multiple hoppers 22 may be separated by interior bulkheads.

Hopper car 20 may include a pair of sidewall assemblies 26 and sloped end wall assemblies 28 mounted on a railway car underframe. The railway car underframe includes center sill 34 and a pair of shear plates 32. A pair of sill plates 32 provide support for sidewall assemblies 26.

Center sill 34 is a structural element for carrying the loads of the hopper car. Center sill 34 transfers the various longitudinal forces encountered during train operation from car to car. Shear plates 30 extend generally parallel with center sill 34 and are spaced laterally from opposite sides of center sill 34.

An operating mechanism for opening and closing discharge assemblies 24 may be coupled to center sill 34. An example is illustrated in FIG. 2.

Figure 2:
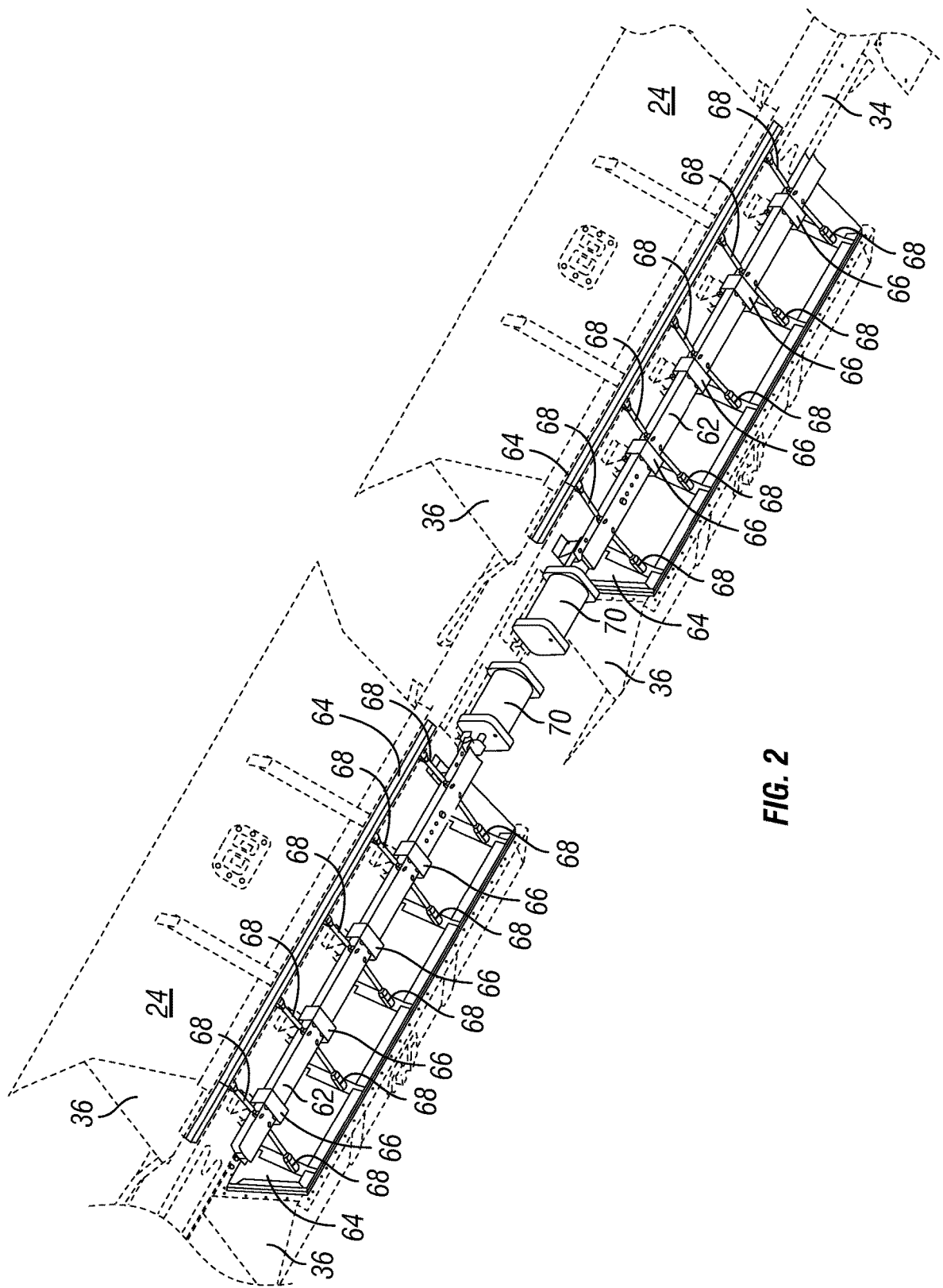
FIG. 2 is a schematic perspective drawing illustrating longitudinal discharge doors underneath an example hopper car.

FIG. 2 is a schematic perspective drawing illustrating longitudinal discharge doors underneath an example hopper car. FIG. 2 illustrates in more detail the two discharge assemblies 24 illustrated in FIG. 1. Discharge assembly 24 includes operating beam 62, discharge doors 64, guides 66, door struts 68, and operating cylinder 70.

Operating beam 62 is coupled to center sill 34 by guides 66. Operating beam 62 is coupled to discharge door 64 by door struts 68. Operating cylinder 70 is coupled to operating beam 62 and is operable to move operating beam 62 back and forth through guides 66.

Portions of slope sheet 36 cooperate with adjacent portions of center sill 34 to define longitudinal discharge openings. Longitudinal discharge openings are disposed along opposite sides of center sill 34.

Discharge doors 64 are hinged proximate to center sill 34. Various types of mechanical hinges may engage discharge doors 64 with center sill 34.

Discharge doors 64 are illustrated in the closed position, which prevents the discharge of lading through the longitudinal discharge openings. In operation, operating cylinder 70 moves operating beam 62 through guides 66 to open discharge doors 64 via door struts 68.

At a first end, door struts 68 may be rotationally coupled to operating beam 62. At a second end, door struts 68 may be rotationally coupled to discharge door 64. Rotational coupling may be achieved via, for example, ball joints or any other suitable joint.

Operating cylinder 70 is operable to move operating beam 62 back and forth through guides 66. Operating cylinder 70 may comprise a pneumatic cylinder, or any type of motor suitable for moving operating beam 62 in a longitudinal direction.

Figure 3:
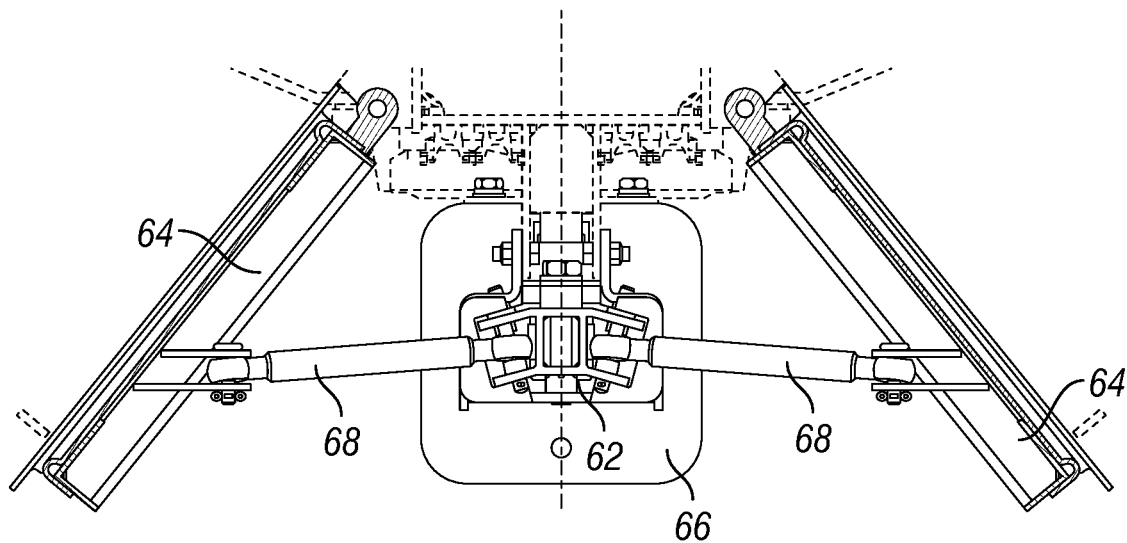
FIG. 3 is a schematic drawing illustrating a cross sectional view of closed longitudinal discharge doors of an example hopper car.

Longitudinal movement of operating beam 62 results in radial extension of door struts 68 to move discharge doors 64 from their open position (see FIG. 4) to their closed position (see FIG. 3). Movement of operating beam 62 in the opposite direction results in pulling, pushing, or moving discharge doors from their closed position to their open position which allows rapid discharge of a lading contained within railway hopper car 20.

Door strut 68 may comprise a compression strut, which provides a compressive force against discharge door 64, strengthening the seal when discharge door 64 is in the closed position.

FIG. 3 is a schematic drawing showing a cross sectional view of closed longitudinal discharge doors of an example hopper car. Operating beam 62 is positioned such that door struts 68 apply pressure to discharge doors 64 holding them against slope sheets 36 of discharge assembly 24 to close the longitudinal discharge opening. Operating cylinder 70 and door struts 68 may be configured to apply more or less pressure to discharge doors 64.

Figure 4:
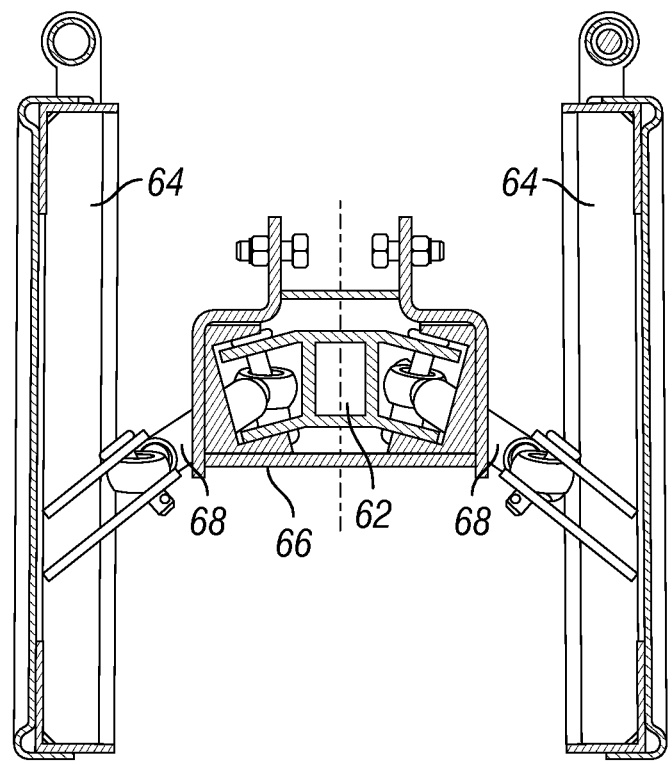
FIG. 4 is a schematic drawing illustrating a cross sectional view of open longitudinal discharge doors of an example hopper car.

FIG. 4 is a schematic drawing showing a cross sectional view of open longitudinal discharge doors of an example hopper car. Operating beam 62 is positioned such that door struts 68 push, pull, or move discharge doors 64 away from slope sheets 36 of discharge assembly 24 to open the longitudinal discharge opening.

Door strut 68 may comprise a conventional compression strut. An example is illustrated in FIGS. 5 and 6.

Figure 5:
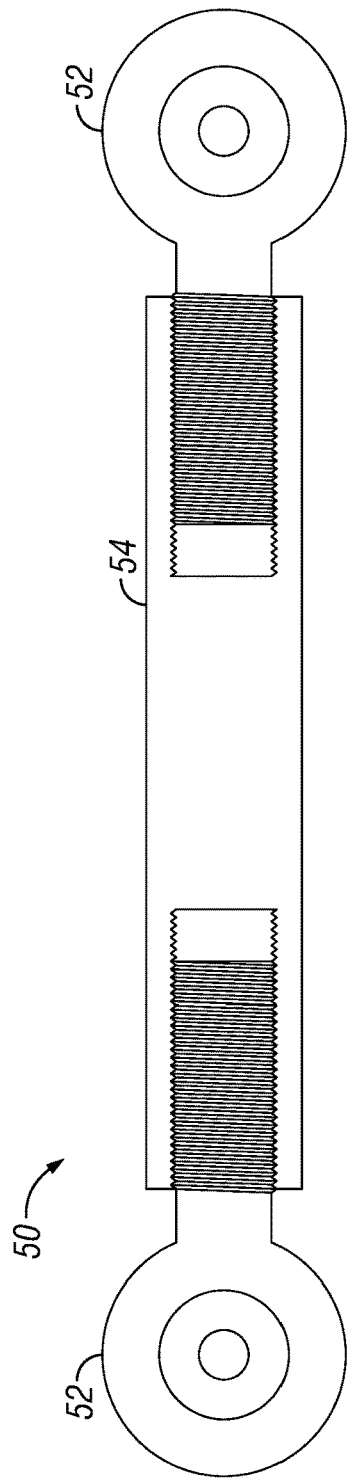
FIG. 5 is a schematic drawing of a cross section of an example compression strut.

FIG. 5 is a schematic drawing of a cross section of an example compression strut. A conventional compression strut typically comprises three pieces: two ball ends and a center section. For example, strut 50 includes ball ends 52 and center section 54. One ball end 52 has a right hand thread and the other ball end 52 has a left-hand thread. Both are threaded into center section 54. Strut 50 is lengthened or shortened (i.e., to provide more or less compression) by fixing ball ends 52 from rotation while turning center section 54. An example is illustrated in FIG. 6.

Figure 6:
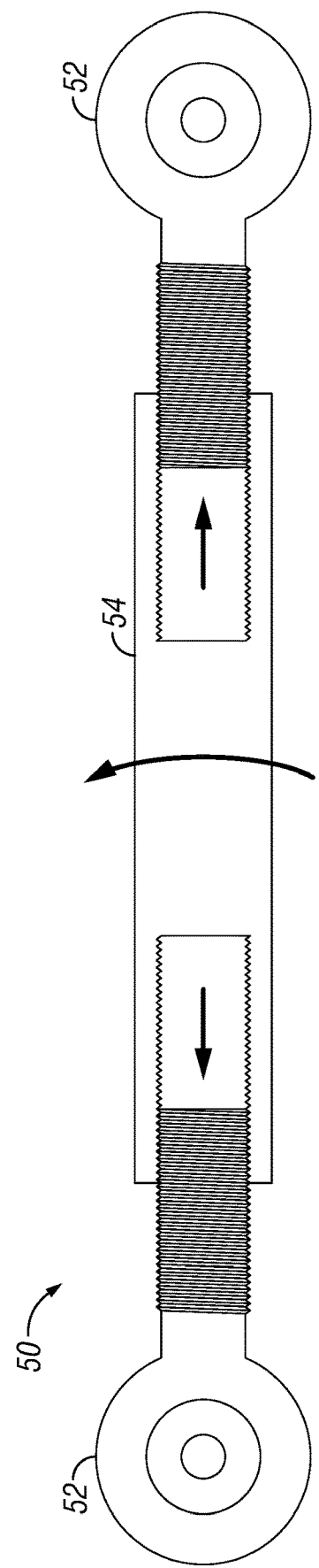
FIG. 6 is another schematic drawing of a cross section of an example compression strut with length adjustment.

FIG. 6 is another schematic drawing of a cross section of an example compression strut with length adjustment. Strut 50 may be lengthened by turning center section 54 in a first direction (illustrated arrow). Turning center section 54 in the first direction unthreads both ball ends 52 from center section 54 extending the length of strut 50. Turning center section 54 in an opposite direction threads both ball ends 52 into center section 54 shortening the length of strut 50.

As a particular example with respect to FIG. 2, one ball end 52 may be coupled to operating beam 62 and the other ball end 52 may be coupled to discharge door 64. After coupling ball ends 52, an installer may turn center section 54 to adjust the amount of compression applied to discharge door 64.

When installed for use on the longitudinal gate, for example, the strut length may be adjusted to achieve a certain desired preload. However, because the effective spring rate of the strut is extremely high, any change in dimensions between the objects the struts are attached to can quickly eliminate the preload. Additionally, an installer may not know the amount of compression in each individual strut without using some type of specialized tool or instrumentation.

Particular embodiments obviate the problems described above and include pre-loaded compression strut. Particular embodiments of the invention and its advantages are best understood by reference to FIGS. 7 through 10, wherein like reference numbers indicate like features.

FIG. 7 is a schematic drawing of a cross section of an example preloaded compression strut, according to a particular embodiment. Compression strut 100 includes two ball ends 102, first strut body 104, second strut body 106, spring 112, block 114, and end cap 116. Some embodiments include washer (or shims) 110.

Ball end 102a has a first threading (e.g., right-hand threading) and ball end 102b has a second threading (e.g., left-hand threading). Compression strut 100 may be assembled by threading ball end 102a into first strut body 104 and ball end 102b into second strut body 106.

First strut body 104 comprises threaded end 118, configured to receive the threaded end of ball end 102a, and hollow end 120, configured to receive a portion of second strut body 106 (e.g., see shaped extension 108 described below).

Second strut body 106 includes threaded end 122 and shaped extension 108. Shaped extension 108 may also be referred to as shaped end 108. End cap 116 is inserted over shaped extension 108 and is operable to slide back and forth longitudinally along shaped extension 108. Shaped extension 108 refers to an extension with a particular cross sectional shape such as square, rectangle, hexagon, octagon, oval, D-shape, or any other polygon suitable to provide sufficient friction between end cap 116 and shaped extension 108 so that when end cap 116 is rotated, shaped extension 108 rotates along with end cap 116. The shape effectively couples end cap 116 to shaped extension 108 while also facilitating longitudinal motion of end cap 116 along shaped extension 108. Example cross sections of the rotational coupling between end cap 116 and shaped extension 108 are described in more detail below with respect to FIGS. 8A and 8B.

First strut body 104 also includes spring 112 disposed within hollow end 120. In the illustrated embodiment, spring 112 comprises a coil spring. In some embodiments, spring 112 may comprise various types of springs, such as an extension spring, a washer-type spring, an elastomeric material, or gases or fluids such as air, hydraulic oil, a gel, etc. Spring 112 may be located either internal or external to first strut body 104 or second strut body 106. Spring 112 is operable to resist a longitudinal compressive force between first strut body 104 and second strut body 106.

In particular embodiments, washer 110 may be inserted in first strut body 104. Washer 110 may adjust the strut preload. For example, additional (or thicker) washers increase the preload and less washers decrease the preload. In some embodiments washer 110 may comprise shim(s) or any other suitable spacer(s) for adjusting the preload. In some embodiments, washer 110 may orient or retain spring 112 in hollow end 120. Washer 110 may prevent spring 112 from entering threaded end 118.

Block 114 is coupled (e.g., welded, threaded, bolted, glued, etc.) to the end of shaped extension 108 (the end opposite ball end 102b). Block 114 is smaller in cross section than hollow end 120 of first strut body 104 and larger in cross section than shaped extension 108 of second strut body 106. Shaped extension 108 with block 114 is inserted into first strut body 104 until first strut body 104 contacts end cap 116. First strut body 104 is coupled (e.g., welded, threaded, bolted, glued, etc.) to end cap 116.

Second strut body 106 is operable to move longitudinally with respect to first strut body 104. Second strut body 106 may be compressed into first strut body 104 until block 114 coupled to shaped extension 108 of second strut body 106 contacts washer 110 (or a shoulder, detent, etc. dividing hollow end 120 and threaded end 118). Second strut body may extended out of first strut body 104 until block 114 contacts end cap 116 coupled to hollow end 120 of first strut body 104.

Spring 112 is disposed between first strut body 104 and second strut body 106 and resists longitudinal compression of compression strut 100. In particular embodiments, the coil spring rate, internal longitudinal clearances, and washer/shim thicknesses may all be varied to achieve a desired preload.

Once assembled, ball ends 102 may be coupled to an external structure, such as the operating mechanism of a hopper car gate. Once ball ends 102 are fixed, rotating either first strut body 104 or second strut body 106 (i.e., the two are rotationally coupled via end cap 114 and shaped extension 108 thus rotating one also rotates the other) adjusts the length of compression strut 100. For example, rotating in a first direction causes both ball ends 102 to unthread from their respective strut bodies (lengthening compression strut 100). Rotating in an opposite directions causes both ball ends to thread into their respective strut bodies (shortening compression strut 100).

FIG. 8A is a schematic drawing of a cross section of the end cap of an example preloaded compression strut, according to a particular embodiment. In the illustrated example, shaped extension 108 comprises a square shape. In other embodiments, shaped extension may comprise a rectangle, hexagon, octagon, star, oval, D-shape, or any other polygon suitable to provide sufficient rotational friction between end cap 116 and shaped extension 108.

In the illustrated example, end cap 116 comprises a rounded cross section. In other embodiments, end cap 116 may comprise other cross sectional shapes to facilitate rotation of end cap 116 (and/or first strut body 104 and second strut body 106). An example is illustrated in FIG. 8B.

FIG. 8B is another schematic of a cross section of the end cap of an example preloaded compression strut, according to a particular embodiment. In the illustrated example, the cross section of end cap 116 comprises a hexagon shape. The hexagon shape may provide an improved grip for an installer to rotate end cap 116, either manually or via a tool corresponding to the cross sectional shape of end cap 116 (e.g., a wrench). In other embodiments, end cap 116 may comprise any suitable cross sectional shape.

When compression strut 100 is connected between two objects in a free standing state, Gap G1 (gap between end cap 116 and threaded end 122 of second strut body 106 in FIG. 7) is maximized to the extent that Gap G2 (gap between block 114 and end cap 116 in FIG. 7) is minimized. Lengthening the strut creates a compression load in the strut. As the strut is continued to be lengthened, Gap G1 begins to decrease as Gap G2 begins to increase at a pre-determined preload in the spring. Continued lengthening increases the preload at the spring rate of the spring until Gap G1 is minimized. Examples are illustrated in FIGS. 9 and 10.

FIG. 9 is a schematic drawing of a cross section of an example preloaded compression strut adjusted to increase compression, according to a particular embodiment. Rotating first strut body 104, end cap 116, and/or second strut body 106 in a first direction (illustrated arrow) causes both ball ends 102 to unthread from their respective strut bodies which lengthens compression strut 100. Lengthening compression strut 100 creates a compression load in compression strut 100. As compression strut 100 is continued to be lengthened, Gap G1 begins to decrease as Gap G2 begins to increase at a pre-determined preload in the spring. Continued lengthening increases the preload at the spring rate of spring 112 until Gap G1 is minimized, as illustrated.

FIG. 10 is a schematic drawing of a cross section of an example preloaded compression strut adjusted to decrease compression, according to a particular embodiment. Rotating first strut body 104, end cap 116, and/or second strut body 106 in a second direction (illustrated arrow) causes both ball ends 102 to thread into their respective strut bodies which shortens compression strut 100. Shortening compression strut 100 releases a compression load in compression strut 100. Compression may be released until Gap G2 is minimized and Gap G1 is maximized, as illustrated.

During operation, should any dimensional changes that lengthen the strut occur between the ball ends, the compression force in the strut will only decrease by the spring rate of the coil spring until the length changes enough to minimize Gap G2. At that point, the strut could become a tension member. During operation, should any dimensional changes that try to shorten the strut occur; the compression load in the strut will go up based upon the stiffness of the ball ends and strut bodies, likely a very high rate.

Although particular embodiments are illustrated, one of skill in the art will recognize other combinations. For example, particular embodiments may include one ball end and one fixed end, or any combination or styles other than ball ends. In some embodiments the end cap and block may be coupled to the strut body either permanently (e.g., welded), semi-permanently (e.g., via threaded connections), or made easily removable using fasteners.

An advantage of particular embodiments is that the embodiments facilitate a limited amount of dimensional changes that affect the length of the strut without significant loss of compressive load within the design limits of the strut. Particular embodiments are flexible to facilitate varying the spring rate and amount of strut extension and compression to match the design requirements.

Another advantage is that the strut can be tightened to a designed-in preload without the use of special tools or instrumentation. By design, the strut will have a specific preload when it is compressed to the point of minimizing Gap G1. When all of the struts are tightened to this point, they will all have the same preload.

Particular embodiments may include methods of assembling a pre-loaded compression strut. An example method is illustrated in FIG. 11.

Figure 11:
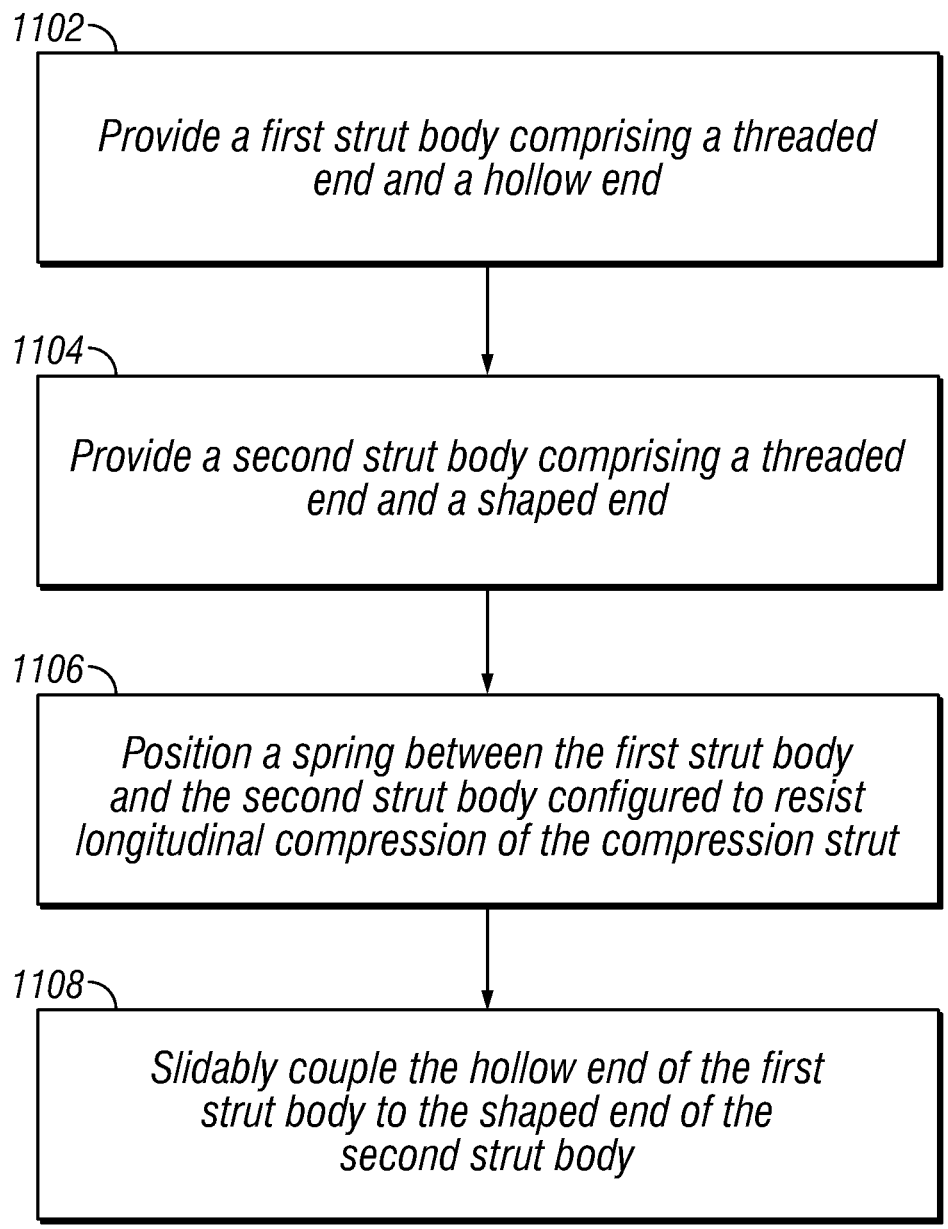
FIG. 11 is a flow diagram of an example method of assembling a pre-loaded compression strut, according to some embodiments.

FIG. 11 is a flow diagram of an example method of assembling a pre-loaded compression strut, according to some embodiments. In particular embodiments, one of more steps of FIG. 11 may be performed suing components described with respect to FIGS. 7-10.

The method begins at step 1102. Step 1102 comprises providing a first strut body comprising a threaded end and a hollow end. For example, the step may comprise providing first strut body 104 with threaded end 118 and hollow end 120.

Step 1104 comprises providing a second strut body comprising a threaded end and a shaped end. For example, the step may comprise providing second strut body 116 with threaded end 122 and shaped end 108.

Step 1106 comprises positioning a spring between the first strut body and the second strut body configured to resist longitudinal compression of the compression strut. For example, the method may comprise positioning spring 112 within hollow end 120 of first strut body 104.

Step 1108 comprises slidably coupling the hollow end of the first strut body to the shaped end of the second strut body. For example, the step may comprise coupling hollow end 120 of first strut body 104 to shaped extension 108 of second strut body 106.

In particular embodiments, slidably coupling the hollow end of the first strut body to the shaped end of the second strut body comprises sliding end cap 116 over shaped end 108 of second strut body 106; coupling block 114 to shaped end 108 of second strut body 106; inserting second strut body 106, end cap 118, and block 114 into hollow end 120 of first strut body 104; and coupling end cap 116 to hollow end 120 of first strut body 104.

In particular embodiments coupling end cap 116 to hollow end 120 may comprises welding end cap 116 to hollow end 120. In some embodiments, coupling end cap 116 to hollow end 120 may comprise removably coupling end cap 116 to hollow end 120, such as with threading or pins. Removably coupling end cap 116 to hollow end 120 facilities easy disassembly for maintenance or repair.

Modifications, additions, or omissions may be made to the method illustrated in FIG. 11. Additionally, one or more steps in the method may be performed in parallel or in any suitable order.

Railcars may benefit from some or all of the benefits described above. For example, particular embodiments may include railcars that use struts where a certain compressive preload is desired over a range of motion, such as with longitudinal gate mechanisms. Although an example of a hopper car is illustrated above, particular embodiments may include any suitable type of railcar that uses a strut for any suitable purpose.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Although embodiments of the present disclosure and their advantages have been described in detail, it should be understood that various changes, substitutions and alternations can be made herein without departing from the spirit and scope of the invention as defined by the following claims.

The invention claimed is:

1. A compression strut comprising:
   a first strut body comprising a threaded end and a hollow end;
   a second strut body comprising a threaded end and a shaped end;
   the hollow end of the first strut body slidably coupled to the shaped end of the second strut body and the first strut body is rotationally coupled to the second strut body so that rotation of the first strut body also rotates the second strut body and rotation of the second strut body also rotates the first strut body;
   a spring disposed between the first strut body and the second strut body configured to resist longitudinal compression of the compression strut; and
   an end cap coupled to the hollow end of the first strut body, the end cap configured to provide rotational friction with the shaped end of the second strut body, rotationally coupling the first strut body and the second strut body.

2. The compression strut of claim 1, further comprising a block coupled to the shaped end of the second strut body, wherein the block and the end cap are configured to prevent the second strut body uncoupling from the first strut body.

3. The compression strut of claim 1, wherein the end cap is removably coupled to the hollow end of the first strut body.

4. The compression strut of claim 1, wherein the spring is disposed within the hollow end of the first strut body.

5. The compression strut of claim 1, further comprising a washer disposed in the hollow portion of the first strut body, the washer configured to apply a particular pre-load to the spring.

6. The compression strut of claim 1, wherein the spring comprises at least one of a coil spring, an extension spring, a washer-type spring, an elastomeric material, a gas, and a fluid.

7. The compression strut of claim 1, further comprising a first ball end threaded to the first strut body and a second ball end threaded to the second strut body.

8. A railcar comprising:
   an underframe, a pair of sidewall assemblies, at least one hopper formed between the sidewall assemblies;
   a gate assembly coupled to the at least one hopper to control the discharge flow of lading from the at least one hopper, the gate assembly comprising at least one discharge gate coupled to a gate actuator via at least one compression strut;
   the at least one compression strut comprising:
      a first strut body comprising a threaded end and a hollow end;
      a second strut body comprising a threaded end and a shaped end;
      the hollow end of the first strut body slidably coupled to the shaped end of the second strut body and the first strut body is rotationally coupled to the second strut body so that rotation of the first strut body also rotates the second strut body and rotation of the second strut body also rotates the first strut body;
      a spring disposed between the first strut body and the second strut body configured to resist longitudinal compression of the compression strut; and
      an end cap coupled to the hollow end of the first strut body, the end cap configured to provide rotational friction with the shaped end of the second strut body, rotationally coupling the first strut body and the second strut body.

9. The railcar of claim 8, further comprising a block coupled to the shaped end of the second strut body, wherein the block is configured to prevent the second strut body from separating from the first strut body.

10. The railcar of claim 8, wherein the end cap is removably coupled to the hollow end of the first strut body.

11. The railcar of claim 8, wherein the spring is disposed within the hollow end of the first strut body.

12. The railcar of claim 8, further comprising a washer disposed in the hollow portion of the first strut body, the washer configured to apply a particular pre-load to the spring.

13. The railcar of claim 8, wherein the spring comprises at least one of a coil spring, an extension spring, a washer-type spring, an elastomeric material, a gas, and a fluid.

14. The railcar of claim 8, further comprising a first ball end threaded to the first strut body and a second ball end threaded to the second strut body.

* * * * *